United States Patent [19]

Krüger et al.

[11] 4,373,481

[45] Feb. 15, 1983

[54] DEVICE FOR CONTROLLABLE COUPLING OF TWO SHAFT PARTS WITH A PREDETERMINED ANGLE OF ROTATION CORRELATION

[75] Inventors: Hermann Krüger; Michael Willmann, both of Wolfsburg, Fed. Rep. of Germany

[73] Assignee: Volkswagenwerk Aktiengesellschaft, Wolfsburg, Fed. Rep. of Germany

[21] Appl. No.: 256,557

[22] Filed: Apr. 22, 1981

[30] Foreign Application Priority Data

May 3, 1980 [DE] Fed. Rep. of Germany ....... 3017092

[51] Int. Cl.[3] .................. F02D 13/06; F02D 17/00; F02B 75/32; F16D 25/10
[52] U.S. Cl. ................................. 123/198 F
[58] Field of Search ................................ 123/198 F

[56] References Cited

U.S. PATENT DOCUMENTS

| 902,692 | 11/1908 | Sherman | 123/198 F |
| 1,121,114 | 12/1914 | Moore | 123/198 F |

FOREIGN PATENT DOCUMENTS

| 2753480 | 6/1979 | Fed. Rep. of Germany . | |
| 2828298 | 1/1980 | Fed. Rep. of Germany . | |
| 2055148 | 2/1981 | United Kingdom | 123/198 F |
| 2069059 | 8/1981 | United Kingdom | 123/198 F |

Primary Examiner—Wendell E. Burns

Attorney, Agent, or Firm—Brumbaugh, Graves, Donohue & Raymond

[57] ABSTRACT

In a multi-cylinder internal combustion engine, with a first crankshaft part and a second crankshaft part, a device for coupling the crankshaft parts at a predetermined relative angular position is provided. A friction clutch for pre-coupling the crankshaft parts and for attaining substantially the same speed of rotation has a first thrust element coupled to the first crankshaft part wherein the thrust element is rotatable over an angle relative to the first shaft between a first angular position and a second angular position. A clutch plate is coupled to the second crankshaft part for engaging the thrust element. Means are provided for actuating the first friction clutch wherein the thrust element is maintained in the first angular position during initial actuation of the friction clutch, and moves to the second angular position in response to a reversal in torque transmitted between the crankshaft parts. Engagement means for achieving positive locking engagement between the first shaft and the second shaft comprises a first engagement element mounted to the first crankshaft part to be axially displaced, and a second engagement element fixed to the second shaft part, wherein the engagement elements positively engage only at a predetermined relative angular position. The friction clutch includes means for preventing the engagement of the engagement elements when the thrust element is in a first angular position. Means are included for actuating the engagement means when the thrust element is in the second angular position.

20 Claims, 6 Drawing Figures

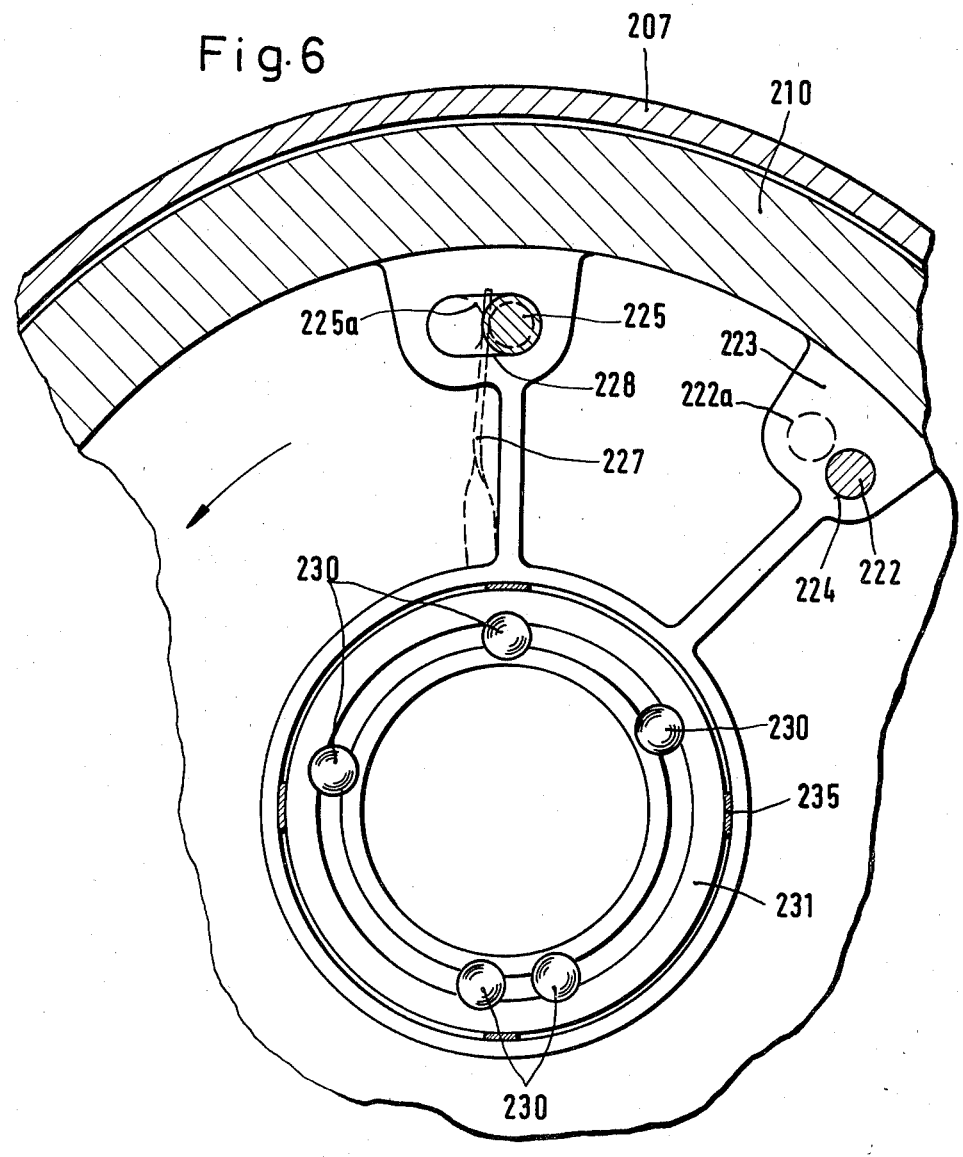

DEVICE FOR CONTROLLABLE COUPLING OF TWO SHAFT PARTS WITH A PREDETERMINED ANGLE OF ROTATION CORRELATION

BACKGROUND OF THE INVENTION

This invention relates to a device for controllably coupling two rotating shaft parts, and more particularly, to coupling two parts of a crankshaft in a multicylinder internal combustion engine for motor vehicles.

A clutch of this type for coupling two rotating shaft parts is disclosed in German Offenlegungsschrift No. 2,753,480, wherein the crankshaft parts are connected at a predetermined relative angle of rotation. Recoupling at the correct rotational position is required in an internal combustion engine in which some of the cylinders, and their pertinent crankshaft parts, are disconnected during certain vehicle operating states, as disclosed, for example, in German Offenlegungsschrift No. 2,828,298.

In the clutch described in Offenlegungsschrift No. 2,753,480, hydraulically actuated friction couplings effect the pre-coupling and the main coupling of the crankshaft parts. A positive coupling can also be provided. The second clutch is hydraulically actuated only within a narrowly limited range of angular rotation so that the precise angle of rotation correlation between the crankshaft parts is achieved.

SUMMARY OF THE INVENTION

The present invention is an improved clutch arrangement which provides a rapid and safe connection of two parts of a crankshaft in a predetermined relative angle of rotation.

A device for coupling first and second crankshaft parts in a multicylinder internal combustion engine has a friction clutch for precoupling the parts to substantially the same speed of rotation. A thrust plate is secured to the first crankshaft part and is rotatable between first and second angular positions with respect to the first crankshaft part. A first axially displaceable engagement element is secured to the first crankshaft part, and engages, only at a predetermined angular position, a second engagement element fixedly secured to the second crankshaft part. When the thrust plate is in the first angular position, engagement between the first and second engagement elements is precluded. The thrust plate rotates to the second angular position in response to a reversal of torque transmission between the first and second crankshaft parts, whereupon the first engagement element is axially displaced to lock positively with the second engagement element so that the crankshaft parts are positively connected.

According to the present invention, the first and second crankshaft parts are coupled in the predetermined relative angular position only when, in the course of the pre-coupling, the two crankshaft parts have practically the same speeds of rotation since a reversal of the torque transmission will not occur until the slower shaft (which was initially disconnected and stationary, and thereby dragging during the initial pre-coupling) has substantially caught up to speed with the other shaft and the pistons and cylinders of the formerly disconnected crankshaft part drive the formerly disconnected shaft, at least momentarily, faster than the other shaft.

For a better understanding of the invention, reference is made to the following Detailed Description of the preferred embodiments, taken in conjunction with the accompanying drawings.

BRIEF DESCRIPTION OF THE DRAWINGS

FIG. 6 is a section view taken along the lines VI—VI of FIG. 5.

DETAILED DESCRIPTION

Figure 1:
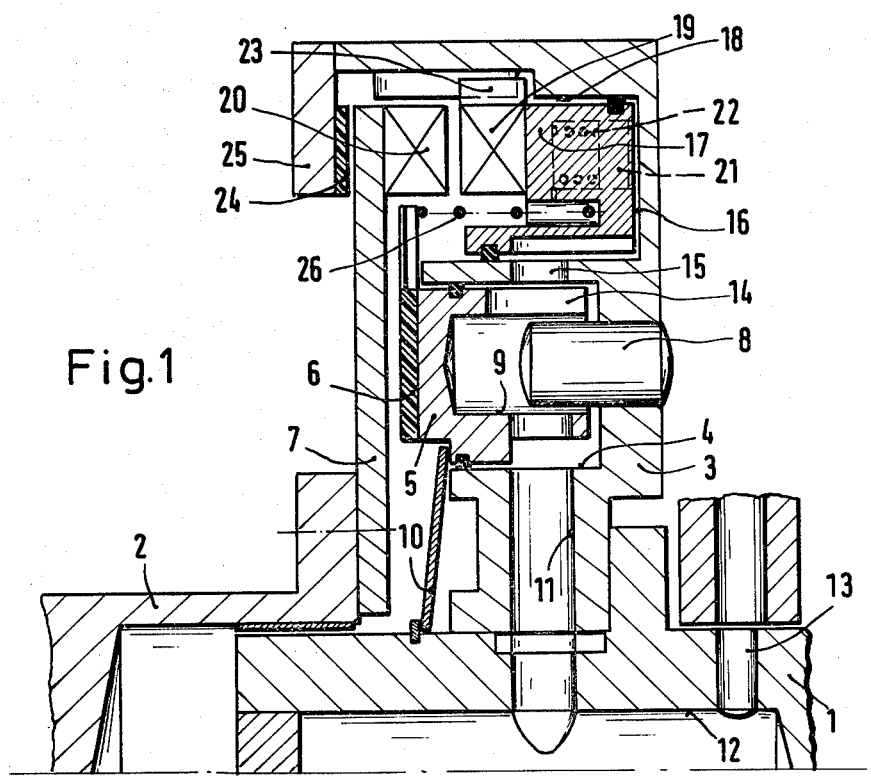
FIG. 1 is a longitudinal sectional view, in schematic form, of a first embodiment of the present invention for coupling two crankshaft parts.

Referring to the FIG. 1 embodiment, a first crankshaft part 1 has a multicylinder internal combustion engine which can be connected to a constantly operating crankshaft part 2 in order to increase the power output of the engine. The clutch connecting the crankshaft parts 1 and 2 includes a housing 3 connected to the crankshaft part 1 with an annular cylindrical recess 4 receiving an annular cylindrical thrust piston 5. The thrust piston 5, adjustably held in the annular cylindrical recess 4, has at its front face a clutch lining 6 which the piston 5 applies to the face of a clutch plate 7 secured to the constantly operating crankshaft part 2. A stop pin 8 held in the clutch housing 3 mates with an arcuate slot 9 provided in the thrust piston 5, such that the piston 5 can rotate about the shaft 1 over the length of the arc of the slot 9. A return spring 10, designed as a cup spring, biases the annular piston 5 to the right in the figure against, as described below, axial displacement of hydraulic fluid in the chamber 4, which is delivered over lines 13, 12, and 11. The return spring 10 engages a stop disposed on the shaft 1.

A recess 14 located on the outer circumference of the annular piston 5 aligns with a window 15 in the clutch housing 3 only at a predetermined angular position, thereby establishing fluid communication to a hydraulic cylinder 16. The hydraulic cylinder 16 constrains an annular piston 17. The annular piston 17 is adjustably held in an annular cylindrical recess 18 of the clutch housing 3 and includes a gear 19 on its face for positively engaging a mating gear 20 attached to the thrust plate 7. Gear 23 disposed on the outer circumference of the housing 3 prevents the circumferential rotation of the annular piston 17 relative to the housing 3.

An auxiliary piston 21 is spring loaded by spring 22 disposed within the annular piston 17. As described further below, when pressurized hydraulic fluid is first introduced into chamber 16, and prior to the time the piston 17 is displaceable to the left, auxiliary piston 21 is displaced inwardly. The spring 22 stores energy until such time as piston 17 can move left, whereupon the spring 22 effects rapid axial displacement of the piston 17 when there is a limited rate of delivery of hydraulic fluid from the hydraulic fluid pressure lines.

A second friction clutch lining 24 is secured to a counterplate 25 connected to the clutch housing 3. The pressure of the first piston 5 urges the second friction clutch lining 24 into contact with the clutch plate 7 of the second crankshaft portion 2.

As discussed above, the thrust piston 5 can rotate, within the confines of arcuate slot 9, relative to the shaft part 1 and thereby to clutch housing 3. A return spring 26 engages the thrust piston 5 and biases it in a circumferential direction toward one end of the slot 9.

In operation, if some of the cylinders of an internal combustion engine are disconnected at reduced loads, the disconnected crankshaft part 1 can be reconnected by applying hydraulic fluid over the lines 13, 12 and 11 to axially displace the first thrust piston 5. This effects a pre-coupling towards the left in FIG. 1, whereby the clutch lining 6 contacts the clutch plate 7. An equal and opposite reaction force acts on the clutch housing 3 to apply the clutch lining 24 to the other face of the clutch plate 7. Thus, the clutches transmit a constantly increasing torque from the constantly operating crankshaft part 2 to the nonrotating crankshaft part 1. The engine portion which was previously disconnected, is forced to rotate by the already rotating cylinders, and, by corresponding control of the ignition and fuel supply, produces a power output.

At the start of the clutch engagement cycle, torque is transmitted from the clutch plate 7 to the thrust piston 5, and thereafter to the carrier bolt 8 which is forced to rotate by engaging the one end of the arcuate slot 9. Once the second motor portion associated with the crankshaft part 1 has been actuated, and due to continued firing of the cylinders associated with the crankshaft part 1, the crankshaft part 1 eventually will reach and then surpass the rpm of shaft part 2. Accordingly, shaft part 1 is no longer dragged by shaft part 2, and in fact a reversal of the torque transfer occurs so that shaft 1 drives shaft part 2. When this occurs, the shaft part 1 forces the clutch housing 3 to rotate with respect to the thrust piston 5 until the carrier bolt 8, having slid along arcuate slot 9, now abuts the other end of the slotted hole 9. In this second angular position, the recess 14 at the outside circumference of the annular piston 5 lines up with the window 15 so that hydraulic fluid in the chamber 4 flows into the pressure charging chamber 16 of the annular piston 17. The charging of the chamber 16 axially displaces the piston 17 whereby the positive clutch elements 19 and 20 engage. The gearing 23 precludes the piston 17 from rotating in a circumferential direction.

Figure 2:
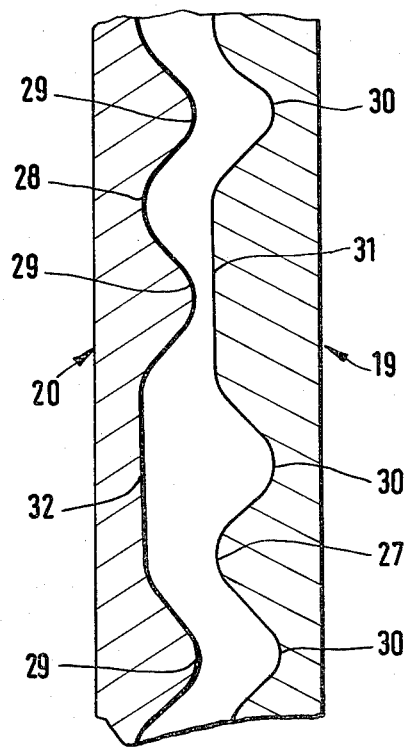
FIG. 2 is a schematic sectional view of the engagement elements of a positive locking clutch according to FIG. 1.

As seen in FIG. 2, the second clutch is a positive engagement clutch which can be engaged only in a correlated angle of rotation between the two crankshaft parts 1 and 2. The second clutch has smooth, sinous, wave-like teeth 27 and tooth gaps 30 on one clutch portion 19 which mate with corresponding tooth gaps 28 and teeth 29 on the other clutch portion 20. In addition, positive locking means 31 and 32 project by shape and/or size and permit a connection of the clutch in a predetermined angular position. In the embodiment of FIG. 2, the clutch portion 19 has teeth 31 non-uniformly distributed over the circumference of the clutch. The teeth 31 mate with corresponding tooth gaps 32. The clutch elements 19 and 20 mate in only one position as defined by the teeth 31 and the corresponding gaps 32. A rolling friction of the teeth 31 on the tips of the sinous or wave-like teeth 29 occurs until a tooth gap 32 mates with a tooth 31 in the proper position, thereby coupling the clutch elements 19, 20.

The teeth 31 and gaps 32 may also be non-uniformly, alternatingly distributed about the circumference of the clutch elements 19, 20.

When the engagement elements 19 and 20 line up, a relatively quick axial displacement of the annular piston 17 is required to connect the crankshaft parts 1 and 2. However, the pressure lines have only a limited supply of fluid, which restricts the rate at which fluid can be delivered to the chamber 16. However, as described above, when fluid is introduced under pressure into the relatively small chamber 16, the annular piston 17 is spring loaded by a spring-biased piston 21. When the clutch elements 19 and 20 are aligned, the stored energy in the spring 22 moves the elements 19 and 20 into engagement without the need for supplying a large quantity of additional pressurized fluid to the chamber 16.

When the crankshaft parts 1 and 2 have been disengaged, the first thrust piston 5 is reset in an axial direction by the plate spring 10. The return spring 26 resets the annular piston 5 in the circumferential (rotational) direction so that it is again positioned against the first end of the arcuate slot 9. The annular piston 17 is reset in an axial direction by a return spring (not shown in the drawing).

Figure 3:
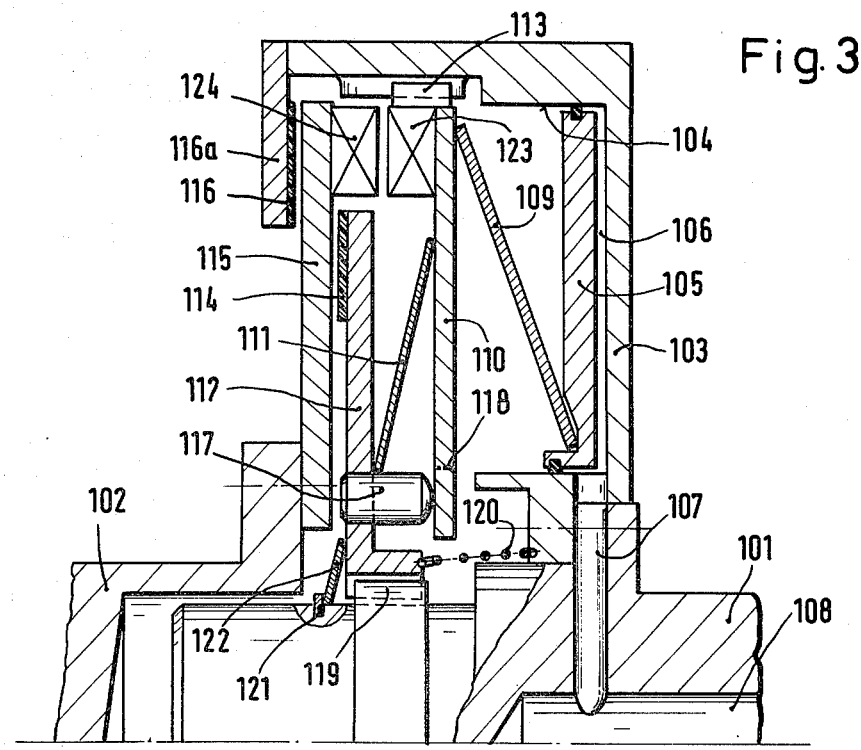
FIG. 3 is a longitudinal sectional view, in schematic form, of an alternate embodiment of the present invention.
Figure 4:
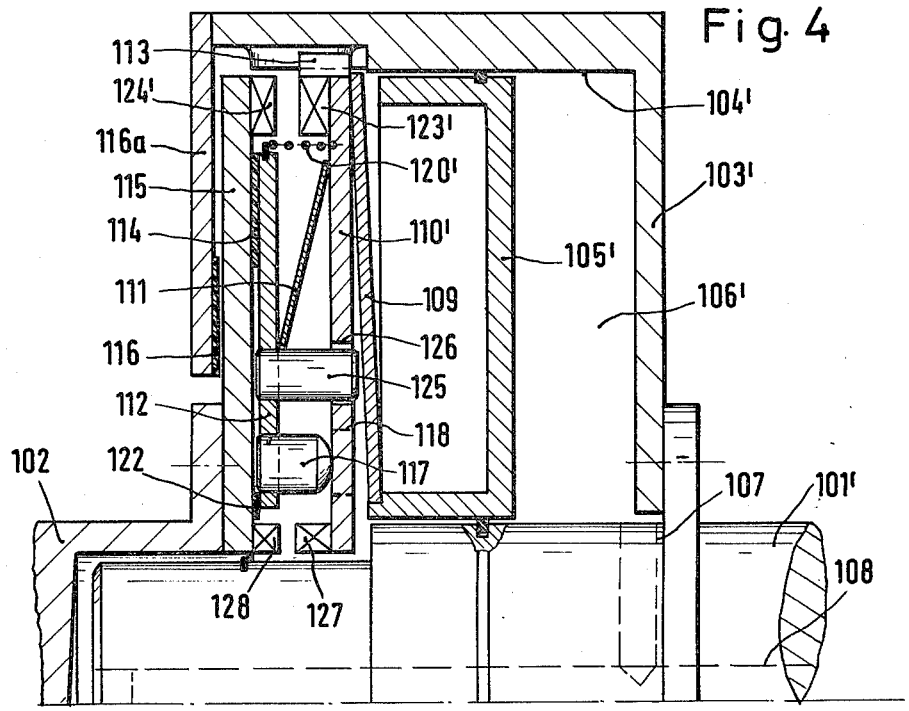
FIG. 4 is a longitudinal sectional view, in schematic form, of a third embodiment of the present invention.

FIGS. 3 and 4 illustrate related embodiments wherein the primed reference numerals indicate elements similar to the corresponding unprimed elements in FIG. 4. The first crankshaft parts 101, 101' are to be coupled with the second, constantly rotating crankshaft parts 102, 102'. The clutch housings 103, 103' have annular cylindrical recesses 104, 104' accommodating annular pistons 105, 105', respectively. The pressure application chambers 106, 106' constrain the annular pistons 105, 105', and are connected by hydraulic lines 107, 108 with a source of pressurized hydraulic fluid. The piston 105 acts on a spring 109 to move an actuating member 110 having the shape of a ring target. A gear 113 located on the circumference of the clutch housing 103 permits the actuating member 110 to be axially displaced but not to rotate, with respect to the clutch housing 103.

A thrust plate 112 forms part of a friction clutch for pre-coupling the crankshaft parts 101 and 102. The thrust plate 112 includes a clutch facing 114, which, upon the application of pressure, engages a clutch plate 115, which is connected to the second crankshaft part 102. A second clutch facing 116 is attached to a counterplate 116a secured to the housing 103, and is urged into contact with the clutch plate 115 when the pre-coupling thrust plate 112 is actuated. A return spring 111 is positioned between the thrust plate 112 and the actuating member 110 and is, in an exemplary embodiment, a cup spring. A return spring 122, which acts upon the thrust plate 112, is held by a retainer ring 121 fitted in a groove of the first crankshaft part 101.

A gear 119 permits axial displacement of thrust plate 112 along crankshaft part 101, but unlike the gears 23 (FIG. 1) and 113 (FIG. 3) which hold the thrust element 19 or 123 against rotation, the gear 119 permits the thrust plate 112 to rotate around the crankshaft part 101 through a limited angle of rotation between a first position and a second position. A spring 120 biases the thrust plate 112 in the housing 103 and urges the thrust plate 112 into the first angular rotation position, shown in FIG. 3.

Thrust bolts 117 are uniformly distributed over the circumference of the thrust plate 112. When the thrust plate is in the first angular position, as shown in FIGS.

3 and 4, the thrust bolts 117 engage the front face of the actuating member 110, thereby transfering thrust from the actuating member 110 to the thrust plate 112. When the thrust plate 112 rotates from its initial position to the second angular position, the thrust bolts 117 mate with recesses 118 in the actuating member 110, thereby precluding the transmission of compressive force from the actuating member 110 to the thrust plate 112. The clutch lining 114 can thus be disengaged from the clutch plate 115 by the spring 122.

The actuating member 110 also positions an engagement element 123 relative to a corresponding engagement element 124 secured to the clutch plate 115 of the second crankshaft part 102. The engagement elements 123, 124 comprise a positively locking clutch and may be formed similar to the clutch elements 19 and 20 of the embodiment of FIGS. 1 and 2, wherein the clutch elements 123, 124 have mating components for a precisely determined angle of rotation coupling of the two crankshaft parts 101, 102.

Hydraulic fluid pressure from the hydraulic lines 107, 108 is applied to the operating chamber 106 of the annular piston 105 and actuates the clutch in the embodiment of FIG. 3. The spring 109 applies axial compressive force initially to the actuating member 110. This axial force is transmitted to the thrust plate 112 by the thrust bolts 117, which, in the first angular position of the thrust plate 112, shown in FIG. 3, abut the face of the actuating member 110, and effectuate a pre-coupling of the crankshaft parts. The bolts 117 at the same time space apart the engagement members 123 and 124 of the positive locking clutch. The clutch lining 114 is initially applied to the clutch plate 115. Due to the force of reaction exerted by the pressurized fluid on the clutch housing 103, the clutch lining 116 of the counterplate 116a also engages the clutch plate 115. This pre-coupling transmits torque from the crankshaft part 102 to the stationary crankshaft part 101. The cylinders associated with the crankshaft part 101 are thereby cranked. Torque is transmitted from the clutch plate 115 to the thrust plate 112, which in turn drives gear 119 and thereby crankshaft part 101. The gear 119, forming a portion of the crankshaft part 101, maintains the thrust plate 112 in its initial, locked angular position and transmits its torque directly to the crankshaft part 101. When the torque transmission reverses, as, for example, by the firing of the cylinders of the engine associated with crankshaft part 101, the crankshaft part 101 and thereby the activating member 110 turns with respect to the thrust plate 112 by a small angle of rotation permitted by the gear 119. The thrust plate 112 is then in a second position of angle of rotation in which the thrust bolts 117 are positioned to enter the recesses 118 of the actuating member 110. Consequently, the power transmitted from the actuating member 110 to the thrust plate 112 is interrupted, whereby the clutch lining 114 is disengaged. The actuating member 110 can thus be axially displaced thereby causing the positively locking clutch 123, 124 to engage, which when the thrust plate 112 was in the initial angular position, was prevented by the thrust bolts 117 positioned between the thrust plate 112 and the actuating member 110. The positive lock clutch 123, 124 in the second angular position of the thrust plate 112 can now effect engagement, as has been previously described in connection with the embodiment of FIGS. 1 and 2.

As hereinbefore described, the position of the sinuous teeth 31 and the tooth gaps 32 define one angular position between the crankshaft parts 101, 102. A small difference in speed exists between the crankshaft portions 101, 102 since the thrust plate 112 and its associated clutch lining 114 are disengaged from the clutch plate 115. At the same time, the counterplate 116a with its clutch lining 116 remains engaged. The slight difference in speed permits the slow rotation of the two crankshaft parts 101, 102 with respect to each other to engage the positive lock clutch 123, 124.

In the embodiment of FIG. 3, the spring 109 operates analogously to the spring biased system 21, 22 of the embodiment of FIG. 1. The power stored in the spring 109, when the thrust bolts 117 act on the actuating member 110, permit the coupling of the clutch 123, 124 without the use of the hydraulic system.

The embodiment of FIG. 4, which depicts the device with the pre-coupling friction clutch, but not the positive locking clutch engaged, differs from the embodiment of FIG. 3 in that the means establishing the correlated angle of rotation of the two crankshaft parts 101, 102 are separated from the positive lock clutch 123', 124'. Engagement elements 127 and 128 provide a coupling of the shaft parts according to the correlated angle of rotation. In addition, a bolt and arcuate slot 125, 126 replace the gear 119 of FIG. 3 to permit thrust plate 112 to rotate through a limited angle relative to the crankshaft part 101' and thereby the actuating member 110'. The use of identical reference numerals, some of which bear a prime, indicates the various corresponding components of FIGS. 3 and 4.

In the embodiment of FIG. 4, the positive lock clutch 123', 124' can comprise a continuous gear, as, for example, the smooth, sinuous gear of FIGS. 1 and 2. The positive lock clutch 123', 124' is, in a preferred embodiment, capable of engaging only when the engagement members 127 and 128 are in a predetermined relative position. The engagement elements 127 and 128 define a predetermined angle of rotation correlation between the two crankshaft parts with respect to each other. The engagement elements 127, 128 can be formed by one or more teeth which are non-uniformly distributed about its circumference and which mate with corresponding recesses.

Rotating elements can also be used in lieu of teeth to reduce friction. The reduced friction reduces the risk of the clutch remaining in an intermediate position with an improper angle of rotation correlation and without a complete mating of the positive lock clutch 123', 124'.

The engagement elements 127 and 128 are disposed on the inner circumference of the actuating member 110 and clutch plate 115, respectively, with positive lock clutch 123', 124' situated at its outer circumference. In the embodiment of FIG. 4, the mating of the engagement components 127, 128 and the positive lock clutch 123', 124' occurs only when, following the pre-coupling of the clutch lining 114 and the thrust plate 112 with the clutch plate 115, substantial identity of speed of rotation has been effected and the torque transmitted between the two crankshaft parts is reversed. The reversal of torque transmission results in the relative rotation of the first crankshaft part 101' with respect to the thrust plate 112.

Prior to engagement of either the pre-coupling clutch or the positive lock clutch, spring 120' pulls the thrust plate to rotate toward one end of the slot 126, i.e., to the first rotational position. In this position, the bolt 125 engages one end of the slot 126. When the clutch plate 115 begins to rotate the thrust plate 112, the bolt 125, engaging the actuating member in the slot, rotates the actuating member 110', the clutch housing 103', and thereby the crankshaft part 101. The thrust plate 112 remains at this predetermined angle of rotation with respect to the actuating member 110 through the engagement of the bolt 125 held at the thrust plate 112 at the end of the arcuate slot 126, until such time as their is a reversal of torque. At such time, where the actuating member 110' drives the thrust plate 112, the actuating member 110' is able to rotate relative to the thrust plate 112 until the other end of the arcuate slot 126 engages the bolt 125. The gear 113 positioned at the other circumference of the clutch housing 103' holds the actuating member 110 from rotating. The torsion spring 120' returns the thrust plate 112 to its initial position whenever the clutch disengages. The torsion spring 120' engages the outer circumference of the thrust plate 112 and is fastened at its other end to the actuating member 110.

Figure 5:
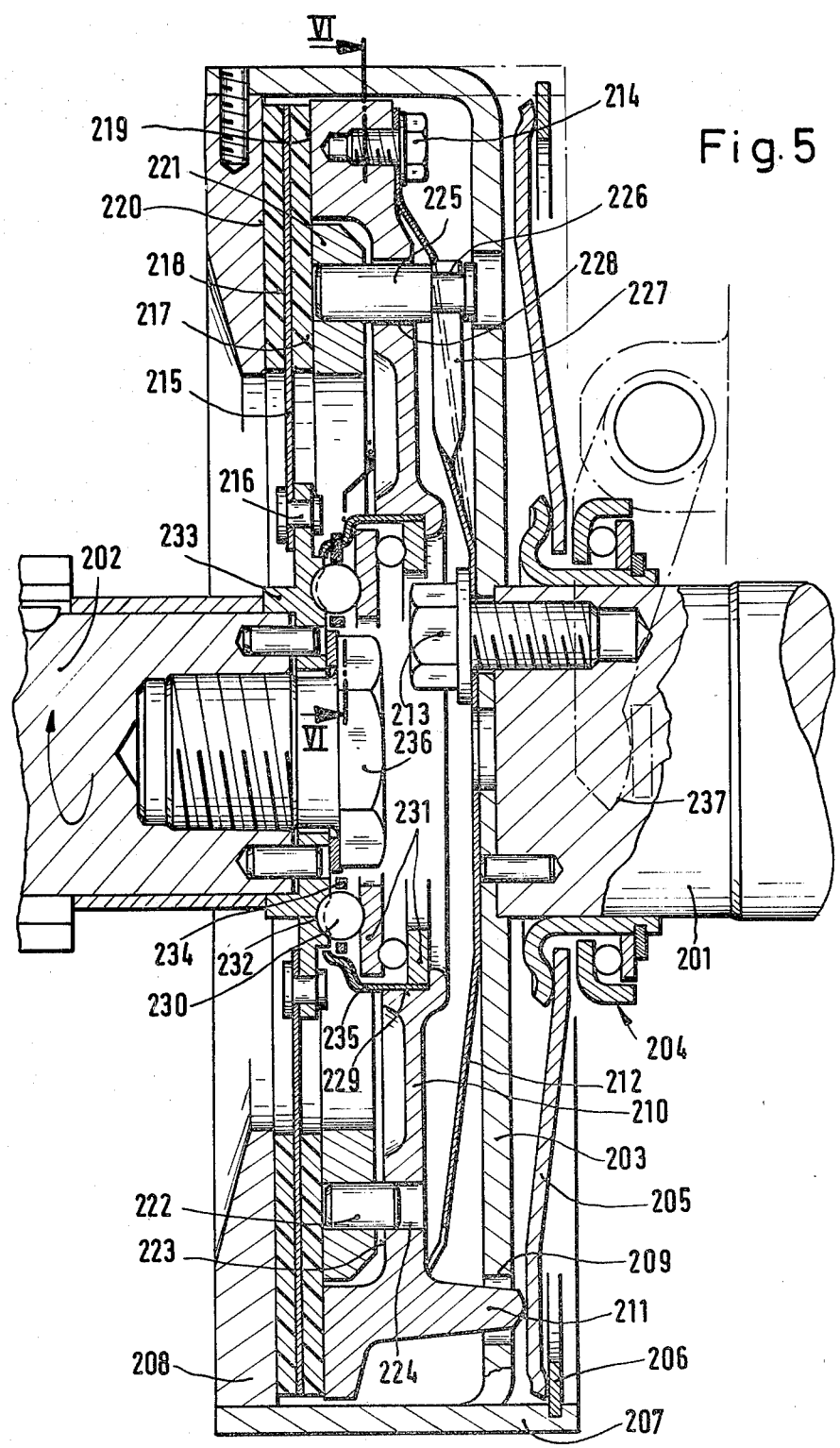
FIG. 5 is a longitudinal sectional view, in schematic form, of a fourth embodiment of the present invention.

In FIGS. 5 and 6, first non-rotating crankshaft part 201 is to be connected to a constantly operating second crankshaft part 202. A clutch housing 203 accommodates the clutch. A release bearing 204, positioned on the crankshaft part 201, engages at its inner edge a clutch spring 205 which urges the clutch into engagement. If the clutch bearing 204 is not actuated, the clutch is engaged. The release bearing 204 may be actuated by a lever assembly 237 to disengage the clutch. The lever assembly 237 can be hydraulically actuated.

An actuating member 210 is connected to the first crankshaft part 201 by means of a diaphragm spring 212 fastened with mounting bolts 213, 214. The diaphragm spring 212 permits axial displacement of the actuating member 210 against the thrust plate 215, but prevents the actuating member 210 from rotating with respect to the crankshaft part 101. The clutch spring 205 engages projections 211 of the actuating member 210. The actuating member 210 has a frontal area 219 which contacts a clutch lining 217 of a clutch plate 215. Rivets 216 secure the clutch plate 215 to a flange 233, fastened in turn to the crankshaft part 202 by a mounting bolt 236. The clutch plate 205 contains a second clutch lining 218 which contacts a front surface 220 of the clutch plate 208 secured to the clutch housing 203. An annular thrust plate 221, forming part of a pre-coupling friction clutch, also applies force against the clutch lining 217 to effectuate a precoupling of the shaft parts 201, 202. At least one, and preferably a plurality, of positioning bolts 225 are fastened to the thrust plate 221. The bolts 225 pass through arcuate slots 228 of the actuating member 210. A spring tongue 227, fixed to the diaphragm spring 212, engages a circumferential groove 226 in the bolts 225 and biases the bolts 225 to rotate the bolts 225 and thereby the thrust plate 221 along the arcuate slot 228 to a first rotational position. The arcuate slot 228 in the actuating member 210 permits a limited, relative rotation of the thrust plate 221.

Thrust bolts 222 are held in the thrust plate 221, which, in the first angular position of the thrust plate 221, abut the face 223 of the actuating member 210, thereby transmitting force for pre-coupling the actuating member 210 with the thrust plate 221. When the transmission of torque is reversed between the two crankshaft parts, causing actuating member 210 to rotate relative to thrust plate 221 to the second angular position shown in solid lines in FIG. 6, the thrust bolts 222 enter the holes 224 of the actuating member 210 and lift the thrust plate 221 from the clutch lining 217, as has been heretofore described in connection with FIGS. 3 and 4.

In the illustrated embodiment, the shaft parts 201, 202 are substantially engaged. In order to assume the illustrated position, the position corresponding to the specified angle of rotation between the two crankshaft parts 201, 202 must have occurred. The correlated angle of rotation is effected through the engagement of the gearing components and comprises the balls 230 engaging corresponding recesses 232 in the clutch flange 233. The balls 230, held in a bearing cage 234 to prevent circumferential movement, and held to the actuating member 210 by a web 235, are non-uniformly distributed over the circumference so that, given a corresponding arrangement of the recesses 232 and the clutch flange 233, engagement is possible only at a predetermined relative angle of rotation. An axial bearing 231 positioned in a recess 229 of the actuating member 210 is provided between the balls 230 and the actuating member 210 to minimize friction during relative rotation between the actuating member 210 and flange 233 while lining up the balls 230 and recesses 232.

When the release bearing 204 is released, the clutch spring 205, reacting against support 206 held by housing portion 207, engages the actuating member 210 through the projections 211. The thrust plate 212 is, in its first angular position, at the one end of the arcuate slot 228, having been moved into such position. In this position, the thrust bolts 211 abut the face 223 of the actuating member 210 so that, at first, only the thrust plate 221 and the clutch plate 215 engage. This precoupling transmits torque from the crankshaft 202 to the crankshaft 201 so that the associated cylinders are actuated. When reverse torque transmission occurs, as in FIGS. 3 and 4, a predetermined, relative angular adjustment between the crankshaft parts 201, 202 occurs as permitted by the length of the arcuate slot 228 engaging the bolt 225. In the second angular position, the thrust bolts 225 enter holes 224. Accordingly, the axial actuating force of the actuating member 210 is no longer transmitted to the thrust plate 221 so that the thrust plate 221 is lifted. At the same time, the bolts 222, having entered the holes 224 in the actuating member 210, no longer act to space apart the frontal area 219 from the clutch plate 215. The force of the spring 212 thereby moves the actuating element 210 and frontal area 219 towards the clutch plate 215, but engagement may still be prevented by the balls 230 if the balls are not already in registry with the recesses 232. If the balls 230 are not in registry with the recesses 232, the ball engagement elements 230 roll along the flange 233 until they are positioned over and enter the recesses 232. At this point, the face 219 of the actuating member 210 can engage the lining 217 of the clutch plate 215 and effect the final positive engagement of the crankshaft parts 201 and 202.

Upon axial displacement of the release bearing 204 to the disengage position, return spring 212 retracts the actuating member 210 from the clutch plate 215. The spring tongue 227 thereafter moves the connecting bolt 225 and thrust plate 221 to the first angular position and the clutch is thus reset.

In FIG. 6, the solid lines illustrate the position of the connecting bolt 225 in the arcuate slot 228, with the thrust bolt 222 positioned in the recess 224, during the second angular position of the thrust plate 221. The phantom lines 225a, 222a indicate the position of these components in the initial angular position of the thrust plate 221.

In the illustrated embodiments, the relative angle of rotational adjustment of the two crankshaft parts can be selected within a range of 360°. This is generally adequate for most internal combustion engines, such as 2 cycle, 4 cylinder opposed engines. In the case of other engine designs, as, for example, 4 cycle vertical engines, a 720° range of rotation adjustment is required to couple the shaft parts. In the latter case, the engagement elements identified by the references 127, 128 of FIG. 4 and references 230 and 232 of FIG. 5 would be driven by a gear on the pertinent shaft at one-half speed so that the engaging positions of the engaging means has 720° of relative rotation between the two crankshaft parts.

We claim:

1. In a multicylinder internal combustion engine having a first crankshaft part and a second crankshaft part, a device for coupling said first and second crankshaft parts at a predetermined relative angular position comprising:

a friction clutch means for pre-coupling said first and second crankshaft parts, for attaining substantially the same speed of rotation, having a first thrust element coupled to said first shaft part, wherein said thrust element is rotatable over an angle relative to said first shaft between a first angular position and a second angular position, and a clutch plate coupled to said second shaft part for engaging said thrust element;

means for actuating said friction clutch means, wherein said thrust element is maintained in said first angular position during initial actuation of said friction clutch means and moves to said second angular position in response to a reversal in torque transmission between said crankshaft parts;

engagement means for achieving positive locking engagement between said first shaft part and said second shaft part, comprising a first engagement element mounted to said first shaft part to be axially displaceable therealong, and a second engagement element fixed to said second shaft part, wherein said engagement elements positively engage only at a predetermined relative angular position wherein said friction clutch means includes means for preventing the engagement of said engagement elements when said thrust element is in said first angular position; and means for actuating said engagement means when said thrust element is in said second angular position.

2. A device as defined in claim 1 wherein said first engagement element comprises a second thrust element slidably mounted to said first crankshaft part, and said engagement means comprises a return spring for biasing said second thrust element away from said second engagement element.

3. The device in claim 1 or 2 wherein said first engagement element comprises a plurality of nonuniformly distributed rolling means positioned on the face of said thrust element and mating with recesses in a clutch flange secured to said second crankshaft part to connect said parts in said predetermined relative angular position.

4. The device in claim 2 wherein said engaging means comprises at least one tooth positioned on said first engagement element and engaging at least one tooth gap on said second engagement element to connect said parts in said predetermined angular position.

5. The device in claim 2 and further comprising a second clutch secured to said second crankshaft part for engaging only when said engaging means achieves positive locking engagement.

6. The device in claim 5 wherein said acutating means comprises a carrier for a clutch element of said second clutch.

7. The device in claim 6 wherein said second clutch comprises a friction clutch.

8. The device in claim 7 wherein said second clutch is a positively locking clutch.

9. The device in claim 8 wherein said positively locking clutch comprises a plurality of axially interlocking, smooth, sinuous teeth.

10. The device in claim 4 wherein said engaging means has corresponding teeth and gaps whereby said means positively lock said crankshaft parts in said predetermined relative angular position.

11. The device in claim 1 and further comprising a connection securing said first thrust element with said first crankshaft part whereby said thrust plate rotates through a small angle.

12. The device in claim 11 and further comprising a union nonrotatably and slidably securing said first thrust element to said first crankshaft part whereby said first thrust element rotates relative to said actuating means.

13. The device in claim 12 wherein said union comprises gearing with a large rotational clearance.

14. The device in claim 12 wherein said union comprises a bolt engaging a circumferentially positioned arcuate hole in said actuating means.

15. The device in claim 11, 12, 13 or 14 and further comprising a return spring for rotating said first thrust element into an intitial angular position relative to said first crankshaft part.

16. The device in claim 1 and further comprising means for partially disengaging said first clutch when said crankshaft parts are rotating at the same speed.

17. The device in claim 16 and further comprising means for transmitting the compressive force from said actuating means to axially load said first thrust element.

18. The device in claim 17 wherein said transmitting means transmits said compressive force only when said crankshaft parts are in an initial angular position.

19. The device in claim 18 wherein said transmitting means comprises a plurality of axially oriented bolts contacting the face of said actuating means in said initial angular position and fitting in recesses in said actuating means in a second angular position.

20. The device in claim 15 and further comprising a spring tongue controlled by said return spring, engaging a bolt passing through said actuating means and connected to said first thrust element, for rotating said first thrust element into said initial angular position.

* * * * *